(12) United States Patent
Cappello

(10) Patent No.: US 12,070,720 B2
(45) Date of Patent: Aug. 27, 2024

(54) PLANT AND METHOD FOR PRODUCING DECARBONIZED OXIDE OR HYDROXIDE USING CARBONATE AND ELECTRIC POWER

(71) Applicant: LIMENET S.R.L. SOCIETA' BENEFIT, Galbiate (IT)

(72) Inventor: Giovanni Cappello, Galbiate (IT)

(73) Assignee: LIMENET S.R.L. SOCIETA' BENEFIT, Galbiate (IT)

( * ) Notice: Subject to any disclaimer, the term of this patent is extended or adjusted under 35 U.S.C. 154(b) by 0 days.

(21) Appl. No.: 18/258,956

(22) PCT Filed: Dec. 16, 2021

(86) PCT No.: PCT/IB2021/061832
§ 371 (c)(1),
(2) Date: Jun. 22, 2023

(87) PCT Pub. No.: WO2022/137038
PCT Pub. Date: Jun. 30, 2022

(65) Prior Publication Data
US 2023/0390699 A1   Dec. 7, 2023

(30) Foreign Application Priority Data
Dec. 22, 2020   (IT) .................... 102020000031562

(51) Int. Cl.
*B01D 53/62*   (2006.01)
(52) U.S. Cl.
CPC ........ *B01D 53/62* (2013.01); *B01D 2251/404* (2013.01); *B01D 2251/606* (2013.01); *B01D 2257/504* (2013.01); *B01D 2258/02* (2013.01)

(58) Field of Classification Search
CPC ............. B01D 53/62; B01D 2251/404; B01D 2251/606; B01D 2257/504; B01D 2258/02
(Continued)

(56) References Cited

U.S. PATENT DOCUMENTS

| 5,965,103 A | 10/1999 | Golley et al. |
| 2003/0127397 A1 | 7/2003 | Emenhiser |

(Continued)

FOREIGN PATENT DOCUMENTS

| JP | S60206489 A | 10/1985 |
| KR | 20130023483 A | 3/2013 |

OTHER PUBLICATIONS

International Search Report issued on Apr. 22, 2022, in corresponding International Application No. PCT/IB2021/061832, 3 pages.
(Continued)

*Primary Examiner* — Anita Nassiri-Motlagh
(74) *Attorney, Agent, or Firm* — Maier & Maier, PLLC

(57) ABSTRACT

A plant and a method for producing decarbonized oxide or hydroxide using carbonate, water and electric power. The plant includes an electric calciner, a contactor, a pH correction apparatus, and a dosing device. The plant is adapted to receive at the inlet electric power, carbonate and water, and to release at the outlet decarbonized oxide or hydroxide and a buffered ionic mixture rich in bicarbonates, which, once released into the sea, represents the permanent storage for $CO_2$. The plant uses the bicarbonates as permanent $CO_2$ storage in the sea: this storage allows a $CO_2$ storage at low costs and in modular plants.

18 Claims, 10 Drawing Sheets

(58) Field of Classification Search
USPC .......................................................... 423/220
See application file for complete search history.

(56) References Cited

U.S. PATENT DOCUMENTS

2003/0160003 A1   8/2003   Maree
2020/0361819 A1   11/2020  Bittner

OTHER PUBLICATIONS

Written Opinion issued on Apr. 22, 2022, in corresponding International Application No. PCT/IB2021/061832, 8 pages.
Rau G H et al: "Enhanced carbonate dissolution: a means of sequestering waste CO2 as ocean bicarbonate", Energy Conversion and Management, Elsevier Science Publishers, Oxford, GB, vol. 40, No. 17, Nov. 1, 1999 (Nov. 1, 1999), pp. 1803-1813, 11 pages.

PLANT AND METHOD FOR PRODUCING DECARBONIZED OXIDE OR HYDROXIDE USING CARBONATE AND ELECTRIC POWER

FIELD

The present invention relates to a method and a plant for producing decarbonized oxide or hydroxide using carbonate and electric power.

The effects of so-called "greenhouse gases" on the climate have long been known, especially the correlation between the concentration in the atmosphere of $CO_2$ (carbon dioxide) and global warming.

BACKGROUND

The efforts of the scientific community and world politics in recent years have been concentrated on trying to counteract the increase in greenhouse gas emissions into the atmosphere, in order to avoid the phenomenon of global warming, i.e. the rise in the average temperature at a global level.

In a per se known way, many initiatives aimed at containing $CO_2$ emissions into the atmosphere have been promoted at an international level: the Kyoto Protocol in 1997 and the Paris Agreement in 2015, among others, are worth mentioning.

The forms identified by the scientific community to avoid global warming are many and substantially concern the decrease in the use of fossil fuels such as coal, oil and natural gas favouring the development of renewable energies such as hydraulic, wind, solar, biomass energy and of zero-emission fuels such as hydrogen or ammonia.

Furthermore, many efforts of the international community are focused on improving the efficiency of energy use, like in the case of lighting with low consumption lamps, on the transport with new generations of high-efficiency engines and, in the field of power generation, on replacing old, inefficient coal- or oil-fired power stations with new combined-cycle plants with gas turbine and vapour turbine having energy yields approaching 60%.

Despite the technological efforts being made in the most advanced nations, the forecasts of well-known international institutions on the energy needs at global level over the next few years indicate a sharp increase in the demand of electric power, thermal energy for industry and of fuels for transportation.

Consequently, these forecasts indicate a steady increase in the use of fossil sources such as oil, coal and natural gas, especially by emerging, newly industrialised and developing countries. This consumption is in fact favoured by the huge availability of these resources and by the discovery of new deposits and techniques for the extraction thereof, factors which altogether make these energy sources economically favourable.

Using the data envisaged by these authoritative studies, a decrease in $CO_2$ emissions is just globally not expected in order to combat global warming, but a substantial increase in the emissions is instead expected over the next 50 years, mainly due to the increase in world population and the new industrialisation of entire countries.

The catastrophic effects of such a situation on the climate are easy to see and difficult to avoid especially because developing nations believe that the renewable energy option is too sophisticated and costly, and are more oriented towards short-term economic development programmes than towards $CO_2$ emission containment and environmental issues.

One of the industries that will be targeted by the future decarbonization of the economy is represented by the lime industry.

The calcination process that transforms the carbonates (limestones and dolomites) into oxides produces large quantities of $CO_2$ mainly coming from the decomposition of the ore at high temperature and secondarily from the fuels used.

It is therefore impossible to decarbonize the lime industry if no permanent $CO_2$ storage is available, even if the fuels used in the calcination process were completely renewable.

Different technologies have been proposed in order to be able to produce oxides with $CO_2$ capture, but with all the proposed technologies there remains the problem of the permanent storage of the $CO_2$ emissions produced in the process.

In a per se known way, $CO_2$ capture and storage technologies are commonly referred to as CCS (Carbon Capture and Storage or also Carbon Capture and Sequestration).

The main CCS technologies proposed and known are:
$CO_2$ sequestration in deep saline aquifers, a method recognised and promoted by the European Union through a specific directive dated 2009;
$CO_2$ sequestration directly in the ocean floor, in liquid form;
the sequestration of $CO_2$ in calcium carbonates or calcium silicates, either directly or with the use of peptoids, known as Mineral Carbonation;
the sequestration of $CO_2$ in oil wells where it is injected to increase the oil production of the well itself with a technology called EOR (enhanced oil recovery);
the sequestration of $CO_2$ in the form of akaline earth metal bicarbonates such as calcium and magnesium bicarbonate.

Although various technological alternatives are available, one of the most important issues still to be solved is the prohibitive cost of $CO_2$ capture and the limited availability of permanent storages of the $CO_2$ produced to offer decarbonized lime-based products on the market.

SUMMARY

As can be immediately understood, there is a need to identify a technology that allows the production of oxides through the carbonate calcination process to be carried out with simple technologies and to solve the problem of storing $CO_2$ in a distributed form throughout the territory at an acceptable cost.

The task of the present invention is to make available a method and a plant that can enable the efficient generation of oxides by calcination of carbonates with permanent storage of $CO_2$ at lower costs than known technologies.

This object and these tasks are achieved by a plant and by a method.

In order to better understand the invention and appreciate its advantages, some exemplary and non-limiting embodiments thereof are described below, with reference to the attached drawings, in which.

DETAILED DESCRIPTION

Figure 1:
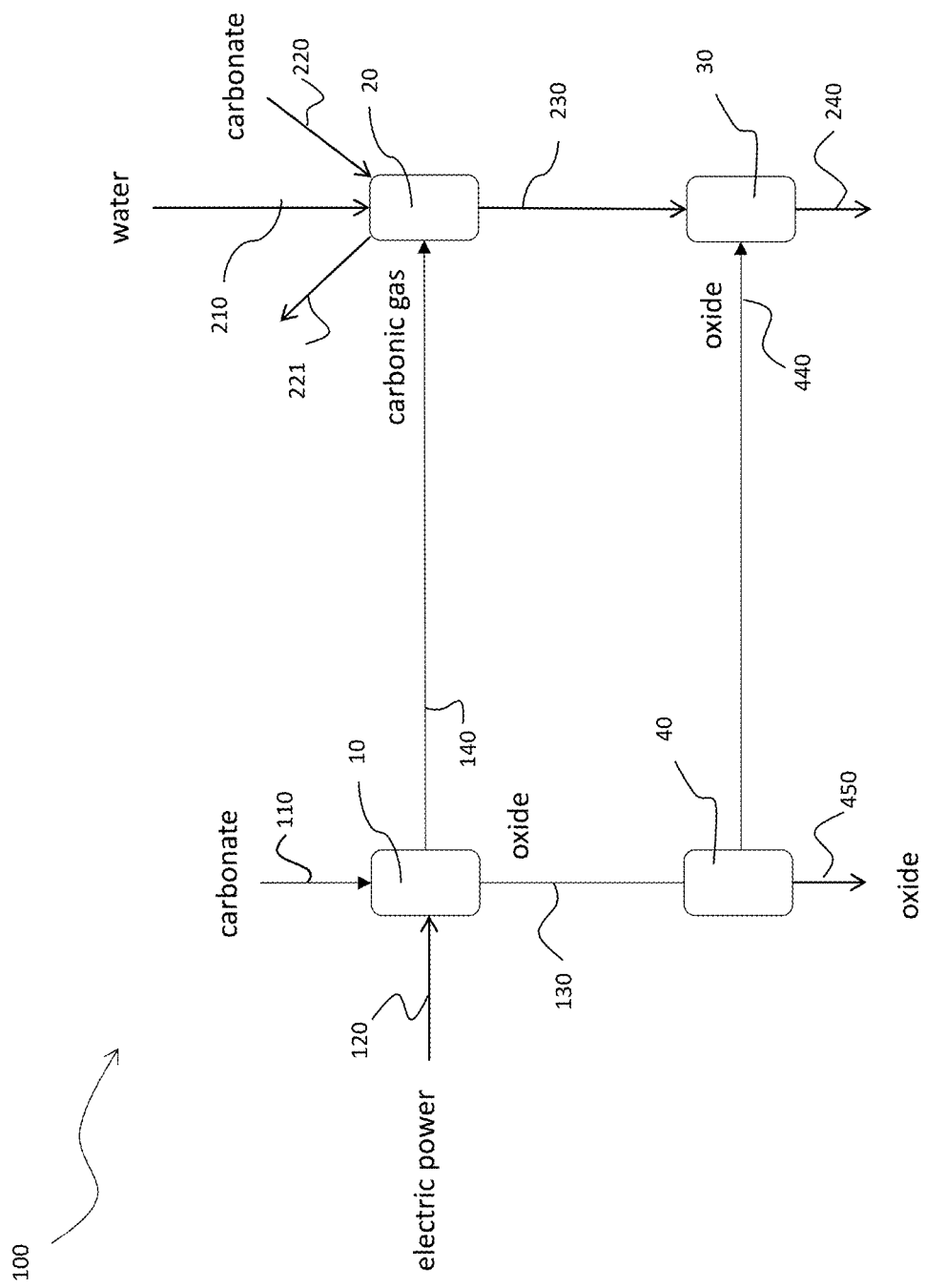
FIG. 1 is a schematic view of a plant for producing decarbonized oxide according to the invention.

In the description, reference will also be made to "carbonic gas", meaning thereby a gas mixture containing mainly $CO_2$, and possibly other substances including $N_2$, $O_2$, $H_2O$, Ar, whereas when reference is intended to be made to the chemical element $CO_2$ (carbon dioxide) alone, $CO_2$ will be used in the description.

In the description, reference will also be made to "non-soluble" gases, meaning thereby all gases that are not very soluble in water, including $H_2$, CO, $CH_4$, $N_2$, Ar.

In the description reference will also be made to "water", meaning thereby water in the liquid phase with the chemical and temperature characteristics necessary for use in the process according to the invention, whereas when reference is intended to be made to the chemical element $H_2O$ alone, $H_2O$ will be used in the description.

In the description, reference will also be made to the "vapour", meaning thereby water in vapour form with the temperature and pressure characteristics necessary for use in the process according to the invention.

In the description, reference will also be made to the "sea", meaning thereby the sea itself but also the ocean, a lake, a river or any salt or fresh water body.

The description will also refer to "carbonate" meaning any calcareous or dolomitic sedimentary rock such as calcite, aragonite, dolomite, siderite, magnesite, marble, but also any other carbonate material such as shells or corals.

In the description reference will also be made to the "electric calciner" (or electric furnace) meaning any electrical apparatus under controlled atmosphere, per se known, capable of calcining the carbonate according to the reactions:

$CaCO_3 \rightarrow CaO+CO_2$ (+183 kJ/mol) or $MgCO_3 \rightarrow MgO+CO_2$ (+118 kJ/mol).

The calcination process, per se known, takes place at temperatures preferably comprised between 600° C. and 1200° C. and is an endothermic process. The controlled-atmosphere electric calciner does not allow direct contact of the calcining zone with the ambient air, while it does allow flushing the calcining zone possibly with water vapour.

In the description, reference will also be made to the "oxide", meaning thereby the product of the calcination formed mainly by calcium oxide CaO or magnesium oxide MgO and to a lesser extent by other materials present in the carbonate rock with which the calciner is fed.

In the description, reference will also be made to the "hydroxide", meaning thereby the product of the hydration of calcium oxide $Ca(OH)_2$ or of magnesium oxide $Mg(OH)_2$ with the following chemical reactions:

$CaO+H_2O \rightarrow Ca(OH)_2$ (−64.8 kJ/mol)

$MgO+H_2O \rightarrow Mg(OH)_2$ (−37.0 kJ/mol)

In the description reference will be made to the "bicarbonates" meaning thereby the chemical compounds $Ca(HCO_3)_{2(aq)}$ and/or $Mg(HCO_3)_{2(aq)}$ In the description, reference will also be made to the "impurities", meaning thereby foreign substances present in the carbonate which do not take part in the chemical reactions in the reactor according to the invention.

In the description, reference will be made to the "contactor", meaning thereby a reactor in which $CO_2$, water and possibly carbonate are reacted according to the following reactions $CO_{2(aq)}+H_2O_{(l)} \rightleftharpoons H_2CO_{3(aq)} \rightleftharpoons H^+_{(aq)}+HCO_{3(aq)}^-$ and $CaCO_3+CO_2+H_2O \rightarrow Ca(HCO_3)_{2(aq)}$ where Ca can be substituted with Mg if it were present in the carbonate rock. This reactor is known as "limestone contactor" or "calcite contactor" and is normally used for remineralising drinking water from reverse osmosis plants and can be with fixed bed (updraft or downdraft), fluidised bed, either pressurised or atmospheric.

In the description, reference will be made to the "ionic mixture", meaning thereby a mixture where the carbonate, if any, has dissolved and $Ca^{2+}$ or $Mg^{2+}$ are in ionic form. "Ionic mixture" also refers to the mixture of water and $CO_2$ alone.

In the description, reference will be made to the "buffered ionic mixture", meaning thereby an ionic mixture in which the pH has been corrected to the desired value by the addition of an oxide or a hydroxide.

In the description, reference will be made to "$\Omega_{cal}$", meaning thereby the calcite saturation state in seawater.

In the description, reference will be made to "pH", meaning thereby the measurement scale indicating the acidity or the basicity of a liquid which is defined by the following formula:

pH=−log$_{10}$[H$_3$O$^+$]

In the description, reference will be made to the "alkalinity", meaning thereby the quantity of hydroxides OH$^-$, carbonates $CO_3^{2-}$ and bicarbonates $HCO_3^{2-}$ present in seawater.

In the description reference will be made to the "hardness", meaning thereby a value expressing the total content of $Ca^{2+}$ and $Mg^{2+}$ ions present in seawater.

In the description, reference will also be made to the "buffering substance", meaning thereby both the oxide and the hydroxide.

In the description, reference will also be made to the "atmosphere", meaning thereby any place in contact with atmospheric air.

In the description, reference will be made to "bar$_a$", meaning thereby the unit of absolute pressure in the CGS system (centimetre-gram-second). 1 $bar_a$ corresponds to $10^5$ Pa in the International System.

In the description, reference will also be made to "high temperature" meaning thereby a temperature greater than 600° C.

In the description, reference will also be made to "ambient temperature", meaning thereby a temperature lower than 50° C.

In the description, reference will also be made to the "preheating temperature", meaning thereby a temperature comprised between 50° C. and 600° C.

In the description, reference will also be made to the "average pressure of the contactor", meaning thereby the weighted average pressure to which the carbonate is subjected during the dwell time in the contactor.

In the description, reference will also be made to the concept of "decarbonized", meaning thereby a product or service that does not entail $CO_2$ emissions into the atmosphere, i.e. where the $CO_2$ produced by the production process has been stored permanently.

In the attached figures, the reference 100 indicates as a whole the plant according to the invention.

A first aspect of the invention concerns a plant 100 for producing decarbonized oxide or hydroxide. With reference to FIGS. 1 to 4, the plant 100 comprises an electrical calciner 10, a contactor 20, a pH correction apparatus 30 and a dosing device 40, wherein:
- the electric calciner 10 is adapted to receive at the inlet a flow of carbonate 110, electric power 120 and to release at the outlet at least one flow of carbonic gas 140 at high temperature and at least one flow of oxide 130;
- the flow of oxide 130 is adapted to provide a flow of buffering substance;
- the contactor 20 is adapted to receive at the inlet the flow of carbonic gas 140 released by the electric calciner 10, a flow of carbonate 220, a flow of water 210;
- the contactor 20 is adapted to make the carbonate 220 react with water 210 and the $CO_2$ present in the carbonic gas 140 according to the following reactions $$CO_{2(aq)} + H_2O_{(l)} \rightleftharpoons H_2CO_{3(aq)} \rightleftharpoons H^+_{(aq)} + HCO^-_{3(aq)} \text{ and}$$

$$CaCO_3 + CO_2 + H_2O \rightarrow Ca(HCO_3)_{2(aq)}$$

(where Ca can be substituted with Mg if present in the carbonate) and to release at the outlet at least one flow of ionic mixture 230;
- the contactor 20 is provided with means for releasing non-soluble gases 221;
- the pH correction apparatus 30 is adapted to receive at the inlet at least one flow of buffering substance 440; 640 and the flow of ionic mixture 230, is adapted to make the ionic mixture 230 react with the buffering substance 440; 640 according to the following reactions

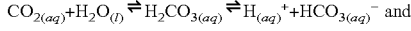
$$CaC + H_2O + 2CO_2 \rightarrow Ca(HCO_3)_{2(aq)} \text{ or}$$

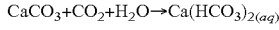
$$Ca(OH)_{2(aq)} + 2CO_2 \rightarrow Ca(HCO_3)_{2(aq)}$$

and to release at the outlet a flow of buffered ionic mixture 240;
- the dosing device 40 is adapted to receive at the inlet a flow of buffering substance 130; 630 deriving from the electric calciner 10 and to release at the outlet a predetermined quantity of buffering substance 440; 640 to feed the pH correction apparatus 30 and possibly a quantity of buffering substance 450; 650 available for use.

In some embodiments of the plant 100 according to the invention (see, for example, FIGS. 1 and 2), the buffering substance is the oxide 130; 440 originated from the electric calciner 10 and the pH correction apparatus 30 is adapted to make the ionic mixture 230 react with the oxide 440 according to the reaction

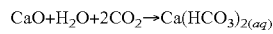
$$CaO + H_2O + 2CO_2 \rightarrow Ca(HCO_3)_{2(aq)}$$

(where Ca can be substituted with Mg if present in the carbonate).

In some embodiments of the invention (see, for example, FIGS. 3A, 3B and 4), the plant 100 further comprises a hydroxide production unit 60 installed between the electric calciner 10 and the pH correction apparatus 30, wherein:
- the hydroxide production unit 60 is adapted to receive at the inlet at least one flow 130; 440 of oxide originated from the electric calciner 10, a predetermined flow of water 610, and
- the hydroxide production unit 60 is adapted to make the oxide 130; 440 react with water 610 according to the reaction

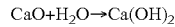
$$CaO + H_2O \rightarrow Ca(OH)_2$$

(where Ca can be substituted with Mg if present in the carbonate) and to release at the outlet a flow of hydroxide 630; 640 and possibly, a flow of vapour 620.

Figure 3A:
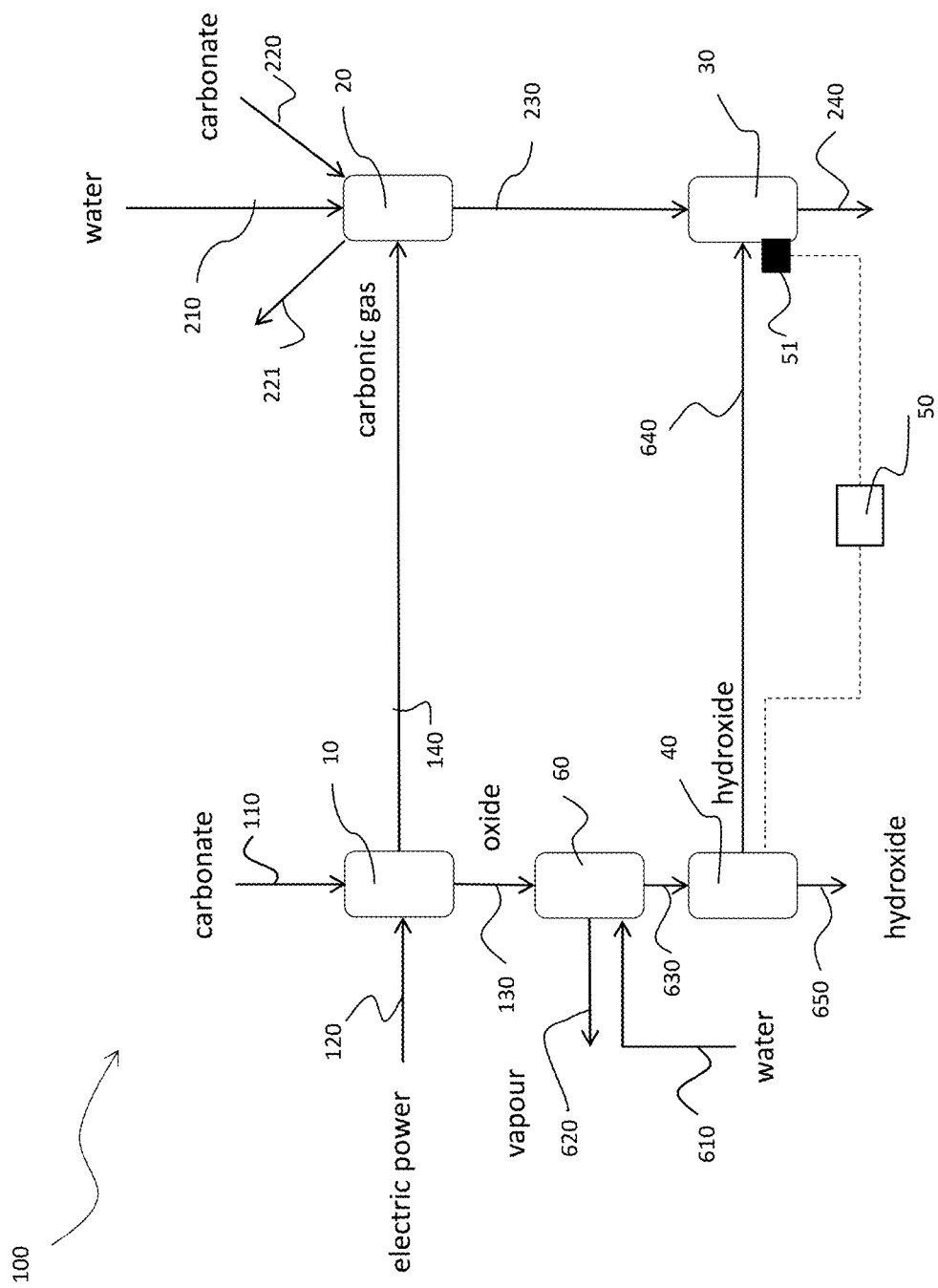
FIG. 3A is a schematic view of a possible embodiment of the plant for producing decarbonized hydroxide according to the invention.
Figure 3B:
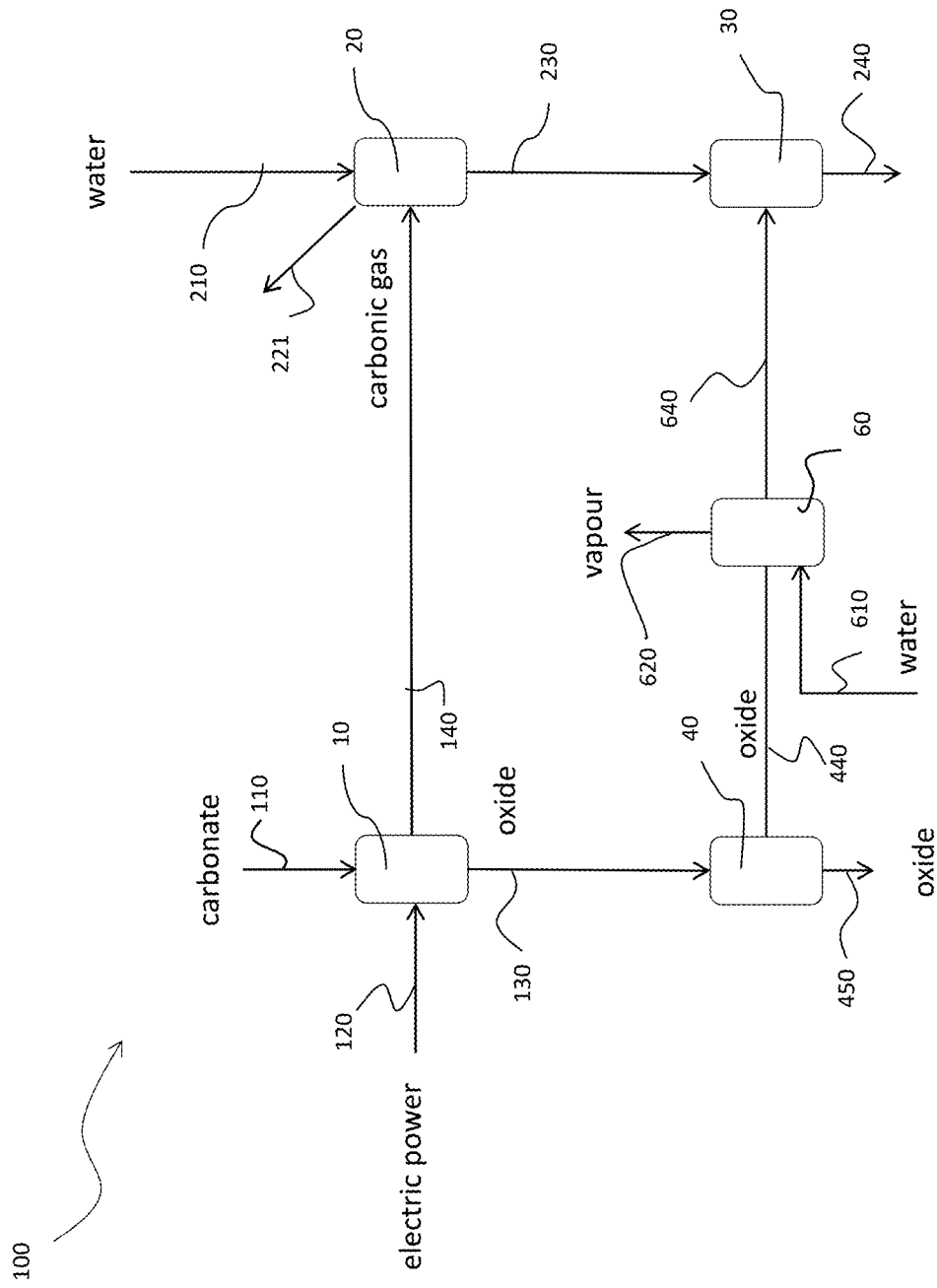
FIG. 3B is a schematic view of another possible embodiment of the plant for producing decarbonized oxide according to the invention.

The hydroxide production unit 60 may be installed between the electric calciner 10 and the dosing device 40 (see FIGS. 3A and 4) or between the dosing device 40 and the pH correction apparatus 30 (see FIG. 3B).

In such embodiments of the plant 100, the buffering substance fed to the pH correction apparatus 30 may be the hydroxide 630; 640 produced by the hydroxide production unit 60.

Figure 2:
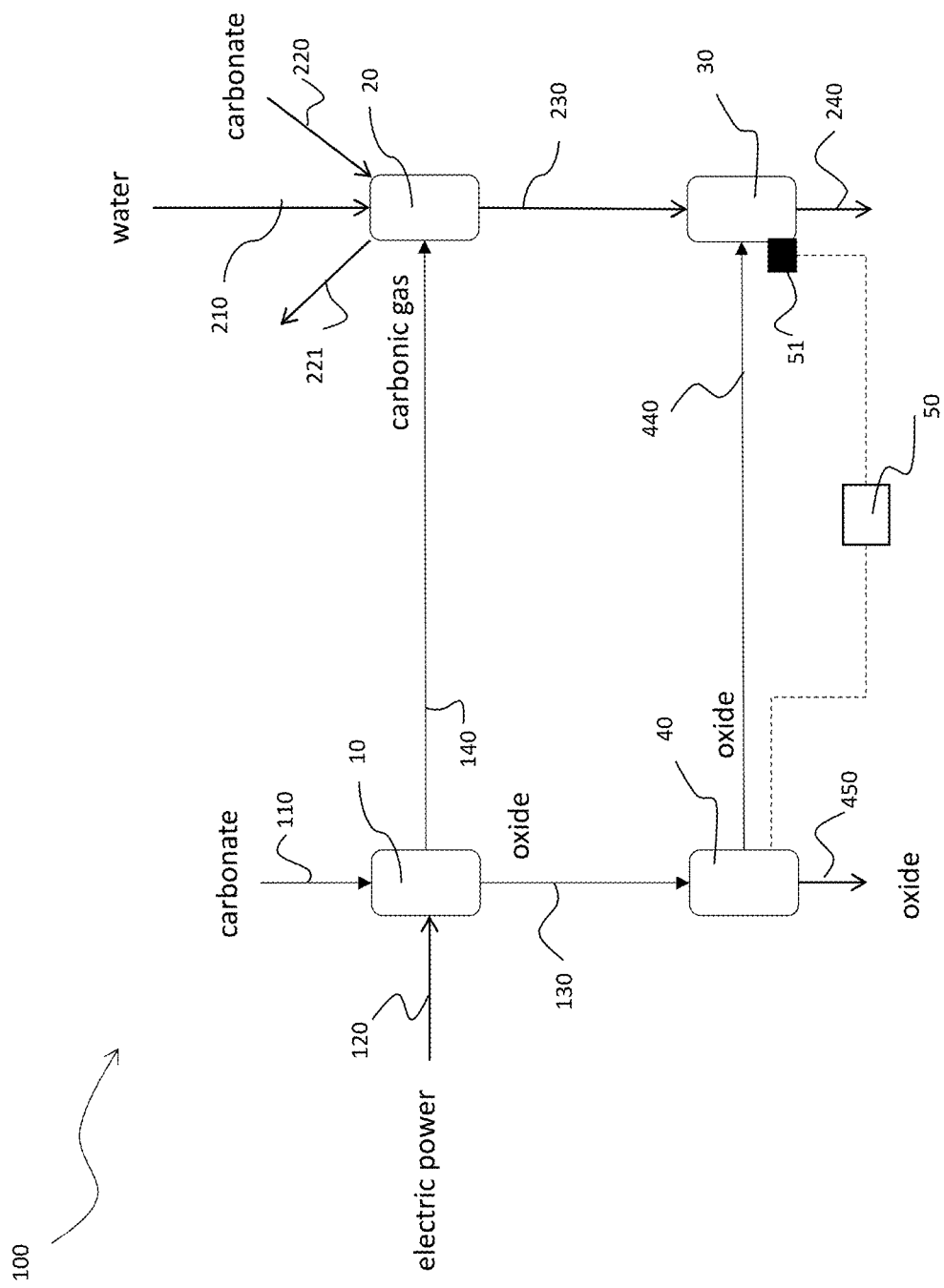
FIG. 2 is a schematic view of another possible embodiment of the plant for producing decarbonized oxide according to the invention.
Figure 4:
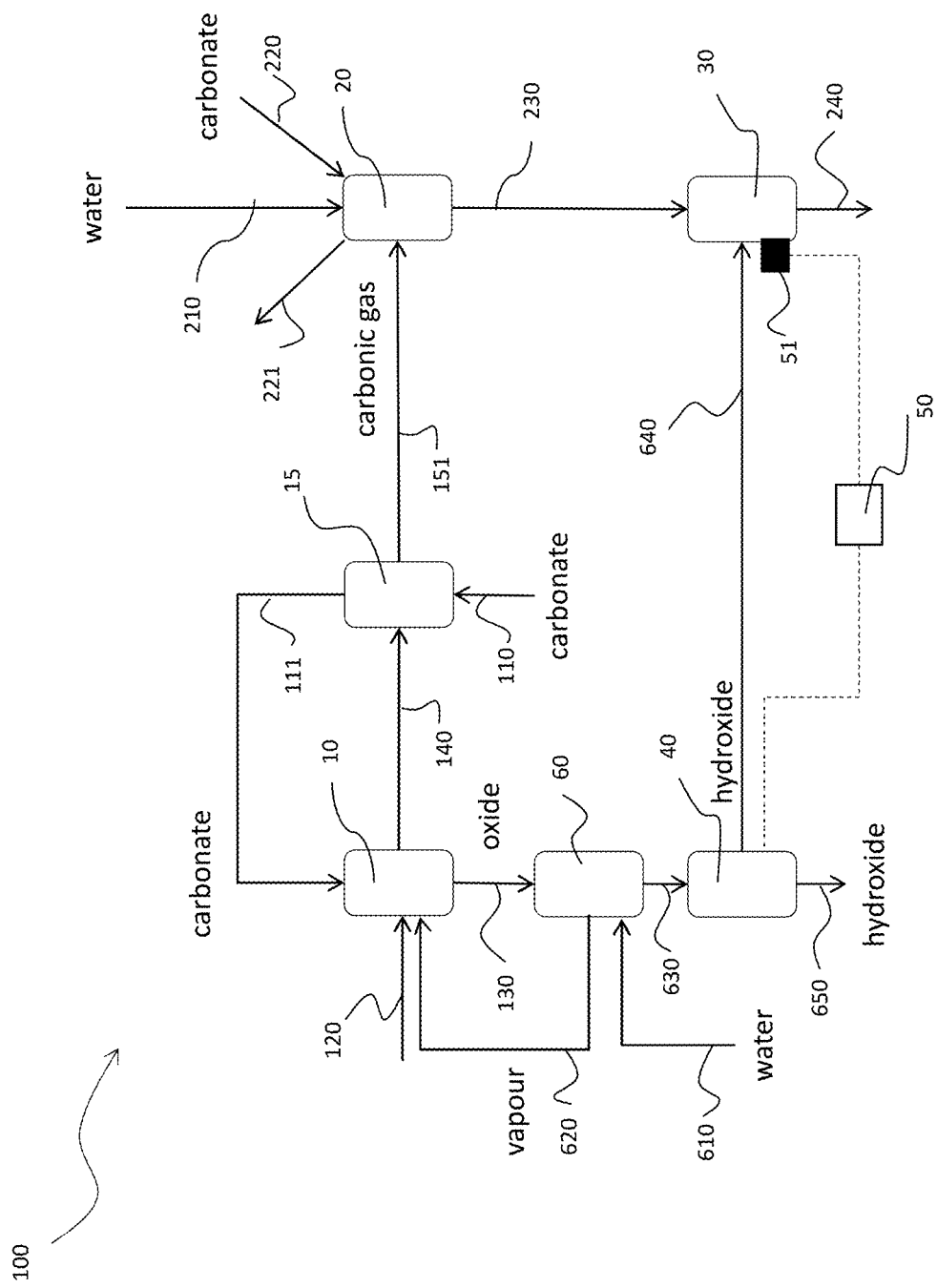
FIG. 4 is a schematic view of another possible embodiment of the plant for producing decarbonized hydroxide according to the invention.

In accordance with an embodiment of the plant 100 according to the invention and with reference to FIGS. 2, 3A and 4, the plant 100 further comprises a control unit 50 and a meter of the chemical parameters of water 51 adapted to measure the pH and/or the alkalinity and/or the hardness of the ionic mixture 230 or of the buffered ionic mixture 240. The meter of the chemical parameters of water 51 is further adapted to provide the measurement to the control unit 50, and the control unit 50 is adapted to control the dosing device 40 so that it feeds the pH correction apparatus 30 with the quantity of buffering substance 440; 640 that is suitable for obtaining a buffered ionic mixture 240 with a desired pH.

In accordance with some embodiments of the plant 100 (see, for example, FIG. 4), the plant 100 further comprises a conduit adapted to feed the flow of vapour 620 released by the hydroxide production unit 60 to the electric calciner 10.

In accordance with some embodiments of the plant 100 (see, for example, FIG. 4), the plant 100 further comprises a carbonate preheating unit 15, wherein the carbonate preheating unit 15 is adapted to receive at the inlet the flow of carbonic gas 140 at high temperature released by the electric calciner 10, a flow of carbonate 110 and to release at the outlet a flow of carbonic gas 151 and a flow of carbonate 111.

In a per se known form, the carbonate preheating unit 15 is a heat exchanger which may be a direct-contact unit in which the flow of carbonic gas comes into direct contact with the carbonate, or it may be an indirect-contact unit in which the carbonate and the carbonic gas always remain separate while exchanging heat.

A skilled person will certainly be able to understand that the size of the contactor 20 depends on the flow rates of carbonic gas 140 or 151, of water 210 and possibly of carbonate 220 and on the kinetics of the chemical reactions that take place. The ratios between the flow rates of carbonic gas 140 or 151, water 210 and carbonate 220 are established with physico-chemical criteria that allow the reactions to be completed $$CO_{2(aq)}+H_2O_{(l)} \rightleftharpoons H_2CO_{3(aq)} \rightleftharpoons H^+_{(aq)}+HCO^-_{3(aq)} \text{ and}$$

$$CaCO_3+CO_2+H_2O \rightarrow Ca(HCO_3)_{2(aq)}$$

(where Ca can be substituted with Mg if present in the carbonate) avoiding the precipitation of carbonates in the pH correction apparatus 30 during the insertion of the buffering substance 440 or 640 due to too high $\Omega_{cal}$.

A skilled person will therefore agree that the required contact time between the water 210, the carbonic gas 140 or 151 and possibly the carbonate 220 is the main parameter that allows sizing the contactor 20: if for a contact time of 10 s, a flow rate of carbonic gas 140 or 151 of 1 kg/s, it were required 1 m³/s of water 210, this means that the size of the contactor 20 must be about 10 m³, whereas if the flow rate of carbonic gas 140 or 151 were 10 kg/s, it would be required 10 m³/s of water and the size of the contactor would be about 100 m³.

In accordance with an embodiment of the plant 100, the contactor 20 has a volume which allows a contact time of the water 210 with the carbonate 220 and the carbonic gas 140 or 151 of at least 1000 s and an average pressure of the contactor greater than 1.0 $bar_a$.

In accordance with an embodiment of the plant 100 (see for example FIGS. 3B and 9), the quantity of carbonate 220 introduced into the contactor 20 is zero and the contactor 20 has a volume which allows a minimum contact time of the water with the carbonic gas 140 or 151 of 10 s, preferably comprised between 60 s and 300 s, which allows for a partial pressure of $CO_2$ greater than 0.1 $bar_a$, preferably comprised between 0.2 $bar_a$ and 2 $bar_a$.

In a per se known form and in accordance with experimental results and the scientific literature, the time it takes for $CO_2$ to completely hydrate in water to form carbonic acid $H_2CO_3$ according to the reaction:

$$CO_{2(aq)}+H_2O_{(l)} \rightleftharpoons H_2CO_{3(aq)} \rightleftharpoons H^+_{(aq)}+HCO^-_{3(aq)}$$

has a characteristic time ranging from a few seconds to a few minutes.

It should be noted here that the carbonic gas fed to the contactor 20 can be either the carbonic gas (indicated with 140) coming directly from the electric calciner 10 or it can be the carbonic gas (indicated with 151) coming from the carbonate preheating unit 15.

It should be noted here that the carbonate fed to the electric calciner 10 can be both carbonate at room temperature (indicated with 110 in FIGS. 1, 2 and 3) and preheated carbonate (indicated with 111 in FIG. 4).

It should be noted here that the buffering substance fed to the pH correction unit 30 may be the oxide (indicated with 440; FIGS. 1 and 2) or it can be the hydroxide (indicated with 640; FIGS. 3 and 4).

It should be noted here that the buffering substance fed to the dosing device 40 can be either the oxide (indicated with 130; FIGS. 1, 2 and 3B) released by the electric calciner 10 or the hydroxide (indicated with 630; FIGS. 3A and 4) released by the hydroxide production unit 60, and that the buffering substance released by the dosing device 40 can be both the oxide (indicated with 440 and 450) and the hydroxide (indicated with 640 and 650).

A second aspect of the invention concerns a method for decarbonized calcination. The method according to the invention comprises the steps of:

providing an electric calciner 10;

feeding the electric calciner 10 with electric power 120 and a flow of carbonate 110; 111 in order to obtain the calcination of the carbonate 110 according to the reaction $$CaCO_3 \rightarrow CaO+CO_2$$

(where Ca can be substituted with Mg if present in the carbonate);

releasing at the outlet of the electric calciner 10 a flow of carbonic gas 140 at high temperature and a flow of oxide 130;

conveying the flow of carbonic gas 140;

conveying the flow of oxide 130;

from the flow of oxide 130 obtaining a flow of buffering substance 440; 640;

providing a contactor 20;

feeding the contactor 20 with the flow of carbonic gas 140 produced by the electric calciner 10 and a predetermined flow of water 210 in order to obtain a flow of ionic mixture 230 through the reaction $$CO_{2(aq)}+H_2O_{(l)} \rightleftharpoons H_2CO_{3(aq)} \rightleftharpoons H^+_{(aq)}+HCO^-_{3(aq)};$$

releasing the flow of ionic mixture 230 at the outlet of the contactor 20;

conveying the ionic mixture 230;

providing a dosing device 40;

feeding the flow of buffering substance 130, 630 to the dosing device 40;

releasing a predetermined flow of buffering substance 440; 640 at the outlet of the dosing device 40;

conveying the flow of buffering substance 440; 640;

providing a pH correction apparatus 30;

feeding the pH correction apparatus 30 with the flow of ionic mixture 230 and with the predetermined flow of buffering substance 440; 640 so that the reactions take place $$CaO+H_2O+2CO_2 \rightarrow Ca(HCO_3)_{2(aq)}, \text{ or}$$

$$Ca(OH)_{2(aq)}+2CO_2 \rightarrow Ca(HCO_3)_{2(aq)};$$

releasing the flow of buffered ionic mixture 240 at the outlet of the pH correction apparatus 30;

placing the flow of buffered ionic mixture 240 into the sea.

In accordance with some embodiments of the invention, the method further comprises the step of feeding to the contactor 20 a predetermined flow of carbonate 220 so that the reaction can take place $$CaCO_3+CO_2+H_2O \rightarrow Ca(HCO_3)_{2(aq)}$$

(where Ca can be substituted with Mg if present in the carbonate).

In accordance with some embodiments of the invention, the flow of buffering substance fed to the pH correction apparatus 30 is a flow of oxide 440.

In accordance with some embodiments of the invention, the method further comprises the steps of:

providing a hydroxide production unit 60;

feeding the hydroxide production unit 60 with a flow of oxide 130; 440 and a predetermined flow of water 610 so that the reaction can take place $$CaO+H_2O \rightarrow Ca(OH)_2$$

(where Ca can be substituted with Mg if present in the carbonate); and releasing at least one flow of hydroxide 630 and one flow of vapour 620 at the outlet of the hydroxide production unit 60.

In accordance with such embodiments of the method, the flow of buffering substance fed to the pH correction apparatus 30 may be a flow of hydroxide 640.

In accordance with such embodiments, the method may further comprise the steps of:
conveying the flow of vapour 620 at the outlet of the hydroxide production unit 60; and
feeding the flow of vapour 620 to the electric calciner 10.

In accordance with some embodiments of the invention, the method further comprises the steps of:
providing a control unit 50 and a meter of the chemical parameters of water 51 adapted to measure the pH and/or the alkalinity and/or the hardness of the ionic mixture 230 or of the buffered ionic mixture 240;
providing the pH and/or akalinity and/or hardness measurement from the pH meter 51 to the control unit 50;
controlling the dosing device 40 by means of the control unit 50 so that it feeds the pH correction apparatus 30 with the correct quantity of buffering substance 440; 640 in order to obtain a buffered ionic mixture 240 with a desired pH.

In accordance with some embodiments, the method may further comprise the steps of:
providing a carbonate preheating unit 15;
feeding the carbonate preheating unit 15 with the flow of carbonic gas 140 at high temperature released by the electric calciner 10 and a flow of carbonate 110;
releasing a flow of preheated carbonate 111 from the carbonate preheating unit 15; and
feeding the electric calciner 10 with the preheated flow of carbonate 111.

Referring to FIGS. 1, 2, 3 and 4, a skilled person will be able to see that the electric calciner 10 is fed with carbonate 110 or 111 and electric power 120 and releases the oxide 130 and the carbonic gas 140. The electric calciner 10 is fed by electric power to generate the heat required for calcination. Electric power can be used in electric resistances, microwave generators or induction systems.

In a per se known form, the calcination of the carbonate 110 takes place according to the reaction $$CaCO_3 \rightarrow CaO + CO_2$$

where Ca can be substituted with Mg if present in the carbonate 110, at temperatures comprised between about 600° (MgCO$_3$) and 1200° C. (CaCO$_3$) and at intermediate values depending on the chemical composition of the carbonate, which can also be a dolomite CaMg(CO$_3$)$_2$, and of the chemical composition of the atmosphere in the calciner.

In a per se known form, the calcination reaction is an endothermic reaction requiring 118 kJ/mol of heat in the case of MgCO$_3$ calcination and 183 kJ/mol in the case of CaCO$_3$.

A skilled person can understand that the CO$_2$ produced by an electric calcination under controlled atmosphere generates a carbonic gas 140 formed by CO$_2$ and traces of non-soluble gases that may have entered with the carbonate 110 or 111 inside the electric calciner 10 or gases intentionally fed to the electric calciner 10 to improve the process conditions, such as in the case of water vapour (FIG. 4).

Referring to the embodiment of FIG. 1, 2, 3 or 4, the plant 100 according to the invention comprises the contactor 20.

In a per se known form, the contactor 20 uses water 210 and carbonate 220 as a means for absorbing CO$_2$ from the flow of carbonic gas 140 and forming the ionic mixture 230 according to the reaction:

$$CO_2(g) + CaCO_3(s) + H_2O => Ca^{2+}(aq) + 2HCO_3^-(aq) \quad [1]$$

where Ca can be substituted with Mg if present in the carbonate 220.

In a per se known form, there exist different types of contactors (limestone contactors or calcite contactors), generally used for the remineralisation of drinking water downstream of desalination treatments.

In a per se known form, the permanent storage of CO$_2$ in the form of bicarbonates in the sea using contactors has been proposed in several scientific articles and patents, among which it is worth mentioning the U.S. Pat. No. 6,890,497 B2 entitled "Method for extracting and sequestering carbon dioxide" and the Italian patent application 102020000000037 entitled "Plant and method for sequestering CO$_2$ with a growing pressure reactor conduit".

In a per se known form, the contactors used for the remineralisation of water or whose use has been proposed for the permanent storage of CO$_2$ in the form of bicarbonates must keep the water that is in contact with the carbonate sufficiently undersaturated, with an $\Omega_{cal}$ preferably comprised between 0.01 and 0.6, to allow a dissolution kinetics of the carbonate that is sufficiently rapid and acceptable for an industrial plant. For this reason, the commercial contactors use an excess of CO$_2$ in the water, a pH generally comprised between 5 and 6, and a final degassing of the CO$_2$ to bring the pH of the water back to values above 7.

In a per se known form, the CO$_2$ storage technologies by means of bicarbonates in the sea include, as mentioned above, the discharge of an acid effluent (pH comprised between 6 and 7), with still a significant quantity of CO$_2$ not reacted with the carbonate according to the reaction [1]. This fact turns out to be environmentally harmful if the effluent discharge takes place in the depths of the sea where there is no possibility of degassing CO$_2$ or it is very inefficient (CO$_2$ storage efficiencies of about 50%) where the discharge takes place on the surface with degassing of the residual CO$_2$.

A skilled person will understand that by neutralizing this acidity present in the acid mixture 230 with a buffering substance 440 or 640, an effluent with the same natural pH as seawater could be discharged into the sea and all the residual CO$_2$ could be stored in the form of bicarbonates according to the reaction $$Ca(OH)_2 + 2CO_2 + H_2O \rightarrow Ca^{++} + (HCO_3)_2$$

where the Ca$^{2+}$ ion can be substituted with the Mg$^{2+}$ ion, eliminating the environmental issues due to the discharge of acid effluents and achieving a CO$_2$ storage efficiency of about 100%.

In a per se known form, the reaction of Ca(OH)$_2$ (where Ca can be substituted with Mg if present in the carbonate) with seawater is a complex reaction due to the presence of other chemical elements and therefore it results that for each mole of Ca(OH)$_2$ it is possible to neutralise less than the 2 moles of CO$_2$ envisaged by the stoichiometry of the equation $$Ca(OH)_2 + 2CO_2 + H_2O \rightarrow Ca(HCO_3)_{2(aq)}.$$

Referring to the embodiment of FIG. 1, 2, 3 or 4, the plant 100 according to the invention comprises the pH correction apparatus 30 in which the ionic mixture 230 is mixed with a predetermined quantity of buffering substance 440 or 640 that is sufficient to obtain the desired pH of the buffered mixture 240.

A skilled person can easily understand that the composition of the ionic mixture 230 released by the contactor 20 may contain impurities which should conveniently be filtered from the mixture 230 by means of special filters (not shown in the figure) placed between the mixer 20 and the pH correction apparatus 30 or downstream of the pH correction apparatus 30.

Referring to the embodiment of FIGS. 2 and 4, the apparatus 100 according to the invention is provided with a meter of the chemical parameters of water 51 adapted to measure the pH and/or the alkalinity and/or the hardness of the water and with a control unit 50 for managing the dosing device 40 which allows feeding the pH correction apparatus 30 with the correct quantity of oxide 440 or hydroxide 640. In the case of hydroxide 640, the dosing device 40 may be a dosing pump as the hydroxide 640 may be fed to the pH correction apparatus 30 in the form of a suspension (slurry) or an ionic solution.

Figure 5:
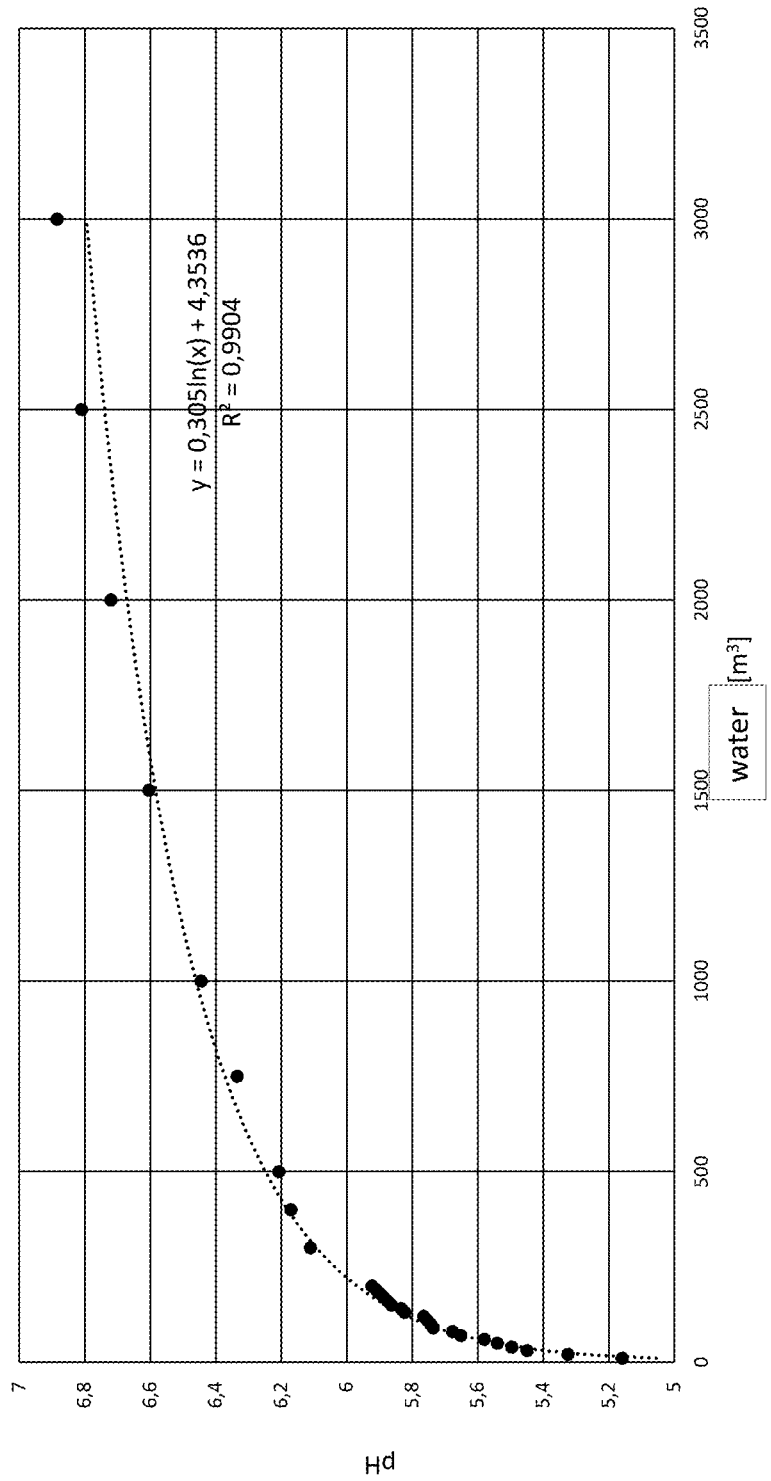
FIG. 5 is a graph of the equilibrium of 2270 kg calcite and 1000 kg $CO_2$ in seawater as a function of the pH and of the quantity of water.
Figure 6:
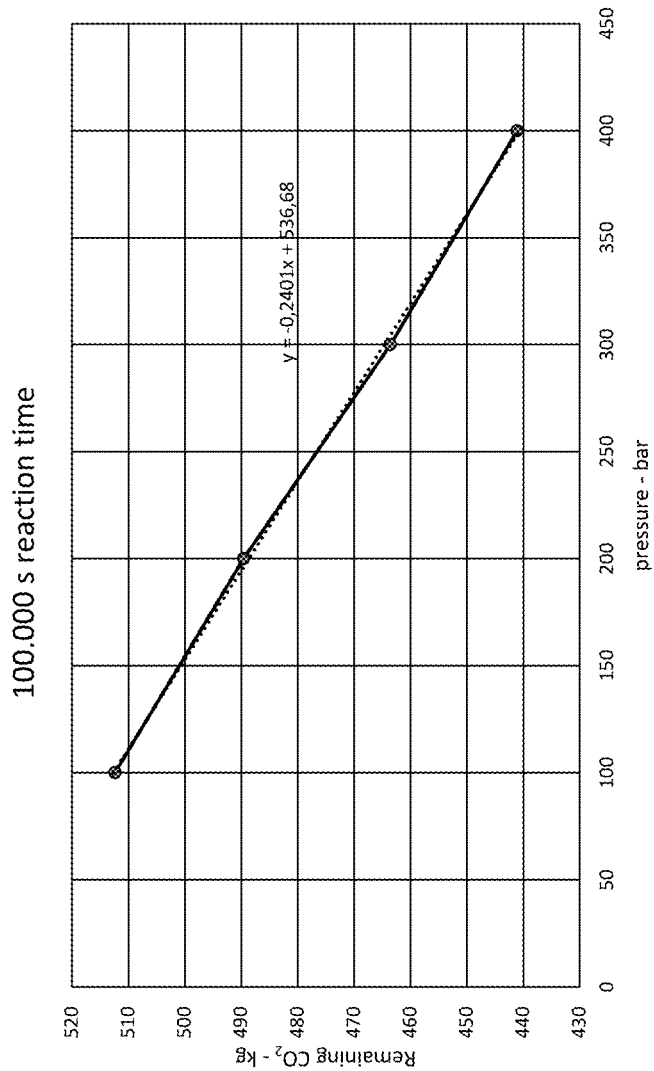
FIG. 6 is the graph of the trend of the residual $CO_2$ quantity after a dwell time of 100000 s in the contactor with 2270 kg $CaCO_3$ with 10 micron size and 1500 m$^3$ of water as a function of the pressure in bar$_a$.

In a per se known form, the dissolution of the carbonate 220 in the contactor 20 depends on the quantity of water and on the pH according to the equilibrium curve presented in FIG. 5 which refers to the complete dissolution of 2270 kg of $CaCO_3$ in seawater in the presence of 1000 kg of $CO_2$.

A skilled person will certainly be able to calculate, with the information available in the literature, the dissolution rate of the carbonate as a function of the quantity of water and the pH and the sizes of the contactor 20.

In a per se known form and as already mentioned above, the dissolution rate of the carbonate decreases asymptotically to zero as the equilibrium conditions are approached and therefore, in order to keep the sizes of the contactor 20 within commercially acceptable limits, it is necessary to maintain process conditions away from the equilibrium by using in the contactor 20 a water pH preferably comprised between 5 and 6.5 with water quantities from 1000 $m^3/ton_{CO2}$ to 4000 $m^3/ton_{CO2}$.

A skilled person can certainly understand that the ionic mixture 230 released by the contactor 20, if not subjected to $CO_2$ degassing with a loss of storage efficiency, generally has a pH comprised between 6 and 6.5, lower than the pH of the sea which is about pH 8.

A skilled person will certainly be able to understand that, in order to avoid acidifying the sea by releasing an acid ionic mixture 230, it is necessary to buffer the pH with a basic substance such as the oxide 440 or the hydroxide 640.

A skilled person will certainly be able to understand that it would also be possible to use other substances to buffer the ionic solution 230, such as NaOH or KOH, but that their cost would make them not economically convenient.

A skilled person will certainly be able to verify that the contact times between the water 210 and the carbonate 220 inside the contactor 20 required for a complete dissolution of the carbonate depend on the sizes of the carbonate 220 itself and on the ratio between the quantities of $CO_2$ present in the carbonic gas 140 and the quantity of water 210.

A skilled person will certainly be able to verify that by using a ratio of mass flow of water 210 to $CO_2$ present in the carbonic gas 140 of less than 2000:1, and a carbonate particle 220 greater than 6 microns, the minimum contact time between water 210 and carbonate 220 inside the contactor 20 that are necessary to have a residual quantity of $CO_2$ in the mixture 230 lower than 80% are higher than 50000 s.

A skilled person will easily be able to verify that with the same mass ratio between the water 210 and the $CO_2$ present in the carbonic gas 140 and by decreasing the quantity of carbonate 220 used in the contactor 20 according to the invention, the necessary contact time between the water 210, the $CO_2$ and the carbonate 220, progressively decreases until reaching a few seconds that are necessary only for the hydration of the $CO_2$ in the particular case in which the carbonate 220 used is zero.

A skilled person will certainly be able to understand that the choice of the contact time between the water 210, the $CO_2$ present in the carbonic gas 140 or 151 with the carbonate 220 or the choice of not using the carbonate 220 to buffer the $CO_2$ present in the carbonic gas but only the buffering substance 440 or 640 are economic choices: in fact, by decreasing the quantity of carbonate 220 used with the same quantity of $CO_2$ present in the carbonic gas 140 or 151 and of water 210, the sizes and the plant cost of the contactor 20 are reduced at the expense of a greater consumption of electric power necessary to produce greater quantities of oxide 130 necessary to buffer the $CO_2$ present in the ionic mixture 230 or of smaller quantities of hydroxide 650 available for sale.

In a per se known form, the dissolution of the carbonate in water is favoured and directly proportional to pressure. A skilled person will certainly be able to understand that it is advisable that the average pressure of the contactor 20 be higher than the pressure of 1 $bar_a$.

Figure 7:
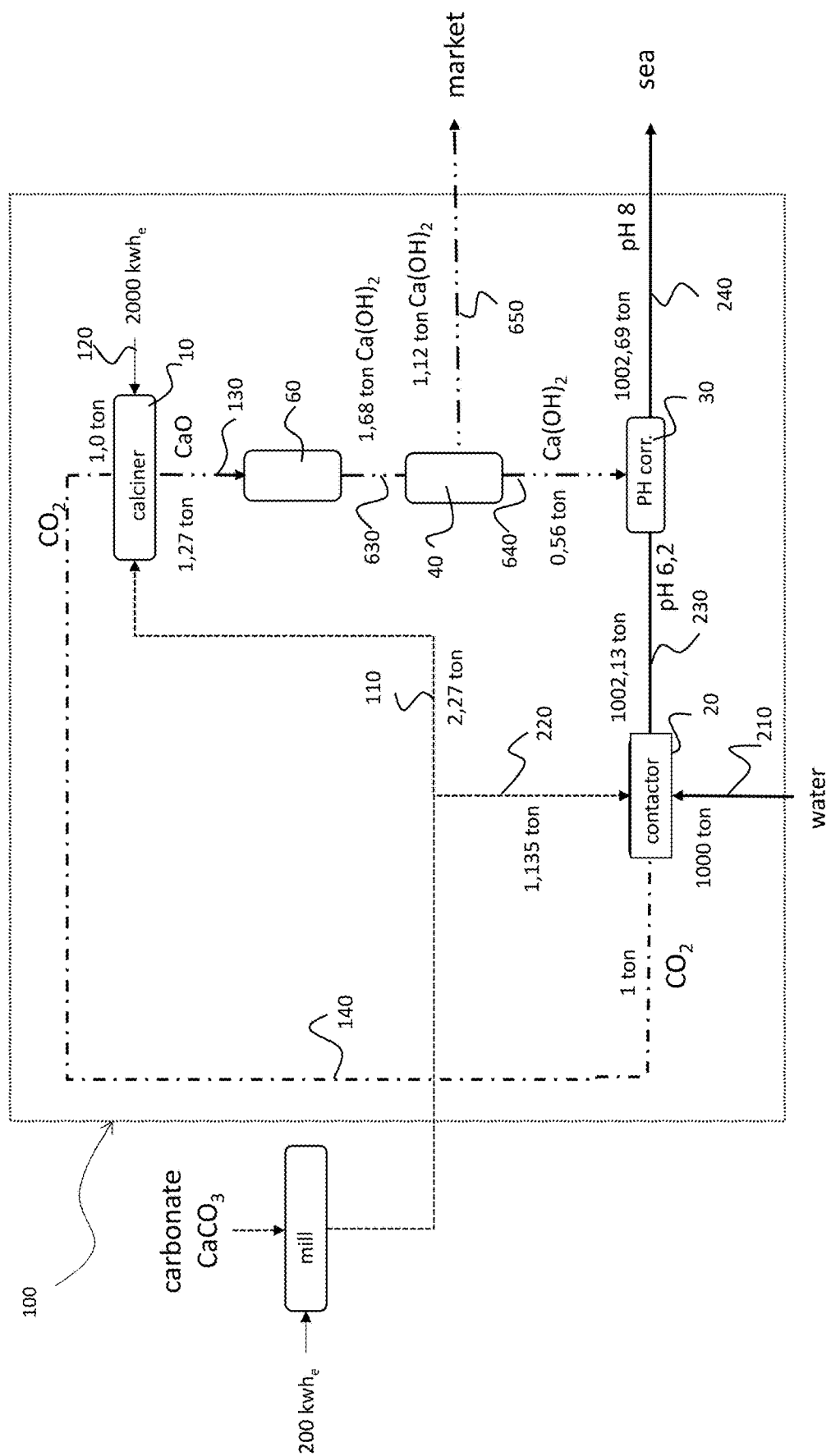
FIG. 7 is a mass and energy balance of a possible embodiment of the plant for producing decarbonized hydroxide according to the invention.

Referring to FIG. 7, a skilled person can certainly understand the simplified mass and energy balance of a particular plant 100 for producing decarbonized hydroxide in which:
the electric calciner 10 is fed by 2270 kg of carbonate ($CaCO_3$) 110 and by 2000 $kWh_e$ of electric power 120 and releases at the outlet 1000 kg of carbonic gas ($CO_2$) 140 and 1271 kg of oxide (CaO) 130;
the contactor is fed by 1000 $m^3$ of water 210 (considered to have a density of 1 $kg/dm^3$), by 1135 kg of carbonate ($CaCO_3$) 220 and 1000 kg of carbonic gas ($CO_2$) 140 and releases at the outlet, after a dwell time of 80,000 s at an average pressure of 150 $bar_a$, 1002135 kg of ionic mixture 230 in which 500 kg of $CO_2$ and a pH of about 6.2 are still present;
the hydroxide production unit 60 is fed by 1271 kg of oxide 130 released by the electric calciner 10 and by a predetermined flow of water (not shown) and releases at the outlet 1680 kg of hydroxide ($Ca(OH)_2$) 630;
the dosing device 40 receives at the inlet 1680 kg of hydroxide 630 released by the hydroxide production unit 60 and releases at the outlet 560 kg of hydroxide 640 to the pH adjustment apparatus 30 and 1100 kg of hydroxide 650 available for sale as decarbonized hydroxide;
the pH correction apparatus 30 receives at the inlet 1002130 kg of ionic mixture 230 released by the contactor 20 and 560 kg of hydroxide 640 released by the dosing device 40 and releases 1002690 kg of buffered ionic mixture 240 with pH of 8 exploiting the reaction

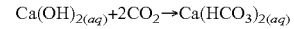

$Ca(OH)_{2(aq)} + 2CO_2 \rightarrow Ca(HCO_3)_{2(aq)}$ where Ca can be substituted with Mg if it were present in the carbonate. In the case of seawater, depending on its chemical composition, 1 mole of $Ca(OH)_2$ neutralises 1.50-2.00 moles of $CO_2$. In the case under examination, a ratio of 1.5 moles of $CO_2$ per mole of $Ca(OH)_2$ is taken into consideration.

As a skilled person can well understand from the above example, the hydroxide 650 available for other uses is a fully decarbonized hydroxide in case the electric power 120 powering the calciner and the electric power (not shown in the example) powering the extraction, the transport and the crushing of the carbonate and the pumping of the water were renewable; otherwise, the hydroxide 650 would be decarbonized except for the share of the emissions due to the energy contribution mentioned above.

As a skilled person can understand, the hydroxide 650, or the oxide 450, can be conveniently used to capture $CO_2$ coming from industrial processes or power plants by means of the reactions

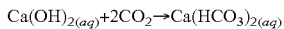
$$Ca(OH)_{2(aq)} + 2CO_2 \rightarrow Ca(HCO_3)_{2(aq)}$$

or, in a less efficient form,

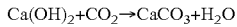
$$Ca(OH)_2 + CO_2 \rightarrow CaCO_3 + H_2O$$

(where Ca can be substituted with Mg if it were present in the carbonate).

A skilled person will certainly be able to understand that the hydroxide 650 or the oxide 450 produced in a plant according to the invention could be conveniently used for capturing $CO_2$ directly from the atmospheric air once dispersed over large areas both in dry and in liquid or slurry form.

Figure 8:
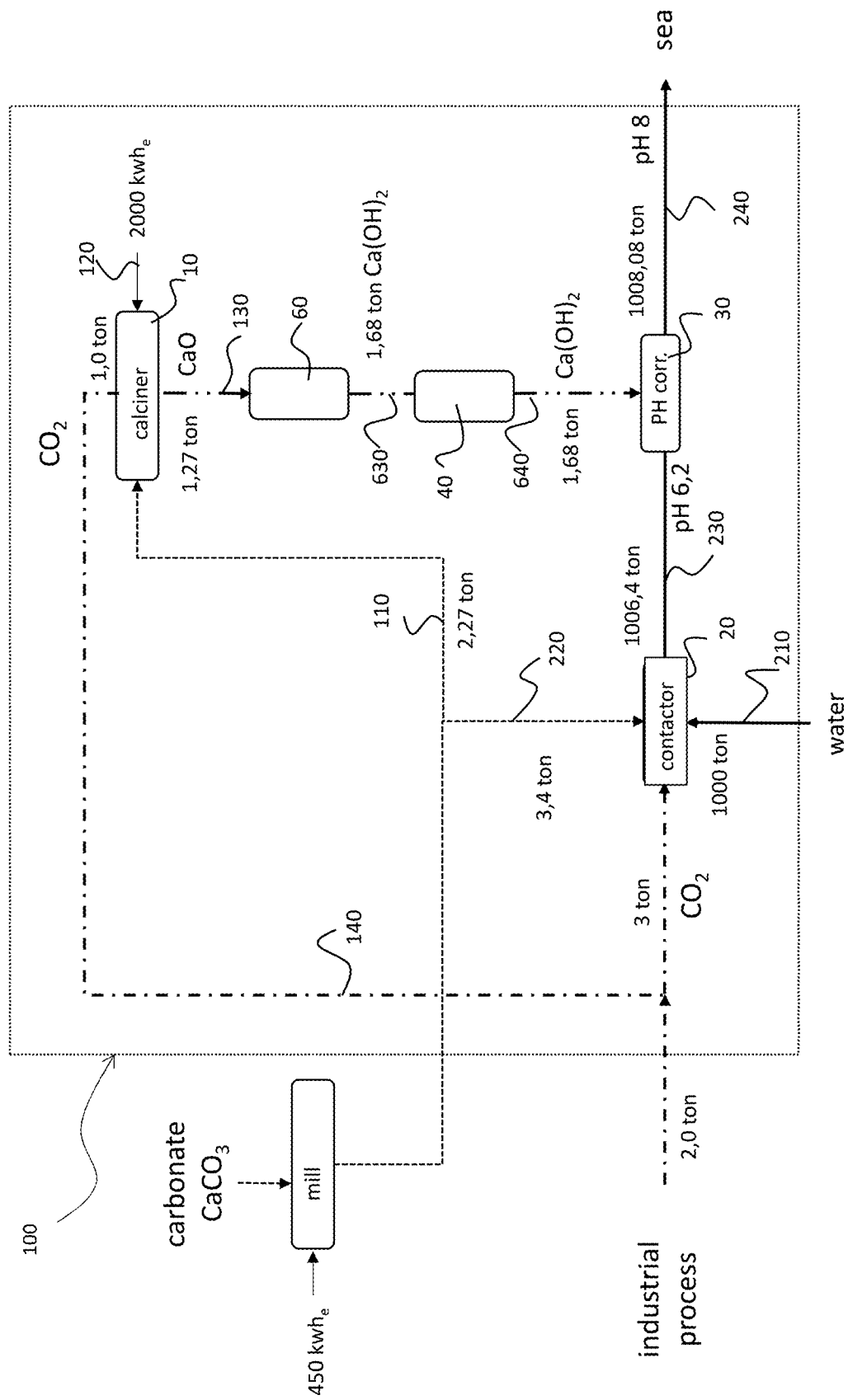
FIG. 8 is a mass and energy balance of a possible embodiment of the plant for storing $CO_2$ coming from an external source according to the invention.

Referring to FIG. 8, a skilled person can certainly understand the simplified mass and energy balance of a particular plant 100 for storing $CO_2$ coming from a source outside the process 100 itself wherein:

the electric calciner 10 is fed by 2270 kg of carbonate ($CaCO_3$) 110 and 2000 $kWh_e$ of electric power 120 and releases at the outlet 1000 kg of carbonic gas ($CO_2$) 140 and 1271 kg of oxide (CaO) 130;

the contactor is fed by 1000 $m^3$ of water 210 (considered to have a density of 1 kg/dm3), by 3405 kg of carbonate ($CaCO_3$) 220 and by 1000 kg of carbonic gas ($CO_2$) 140 and releases at the outlet, after a dwell time of 80,000 s at an average pressure of 150 $bar_a$, an ionic mixture 230 in which 500 kg of $CO_2$ and a pH of about 6.2 are still present;

the hydroxide production unit 60 is fed by 1271 kg of oxide 130 released by the electric calciner 10, by a predetermined quantity of water (not shown) and releases at the outlet about 1680 kg of hydroxide ($Ca(OH)_2$) 630;

the dosing device 40 receives at the inlet 1680 kg of hydroxide 630 released by the hydroxide production unit 60 and releases at the outlet 1680 kg of hydroxide 640 to the pH correction apparatus 30;

the pH correction apparatus 30 receives at the inlet 1006405 kg of ionic mixture 230 released by the contactor 20 and 1680 kg of hydroxide 640 released by the dosing device 40 and releases 1008085 kg of buffered ionic mixture 240 with pH of 8 exploiting the reaction

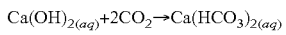
$$Ca(OH)_{2(aq)} + 2CO_2 \rightarrow Ca(HCO_3)_{2(aq)}$$

where Ca can be substituted with Mg if it were present in the carbonate. In the case of seawater, due to its chemical composition, 1 mole of $Ca(OH)_2$ neutralises 1.5-2.00 moles of $CO_2$. In the case under examination, a ratio of 1.5 moles of $CO_2$ per mole of $Ca(OH)_2$ was taken into consideration.

As the skilled person can well calculate using market values, the cost of a ton of decarbonized oxide or hydroxide depends mainly on the cost of the carbonate and electric power, while the plant and labour costs have a marginal impact on the final result. In particular, about 2000 kWh of electric power and 2000 kg of carbonate are needed to produce 1 ton of decarbonized calcium hydroxide $Ca(OH)_2$. If the cost of carbonate were 7.5 €/ton and the cost of renewable electric power were 30 €/MWh (this is the LCOE—Levelized Cost Of Energy of wind power), the variable cost of hydroxide would be 75 €/ton.

A skilled person could therefore calculate that the installation costs of the electric calciner, the contactor, the dosing device, the limestone mill, the civil works and the services account for about 5 €/ton of $Ca(OH)_2$ while the personnel costs are negligible.

A skilled person will therefore be able to calculate that the final cost of a ton of $Ca(OH)_2$ is 80€. Considering that with one ton of $Ca(OH)_2$ used in a $CO_2$ storage plant using a contactor as illustrated in FIG. 8, 0.89 ton of $CO_2$ in the form of calcium bicarbonates or 0.59 ton of $CO_2$ in the form of calcium carbonates can be permanently stored, the cost of $CO_2$ storage according to the invention would be about 89 €/ton and 135 €/ton respectively.

As a skilled person may certainly know, if a ton of hydroxide $Ca(OH)_2$ were spread on the sea surface in a process known as "ocean liming", 0.9 tons of negative $CO_2$ emissions would be generated: in that case, 1 ton of negative $CO_2$ emissions would cost about €90.

As a skilled person may certainly know, if a ton of hydroxide $Ca(OH)_2$ were spread on a solid surface such as on a wall or on the ground in contact with atmospheric air, this would absorb the atmospheric $CO_2$ transforming into calcium carbonate $CaCO_3$, generating 0.59 tons of negative emissions: in such a case, 1 ton of negative $CO_2$ emissions would cost about 135 €.

In a per se known form, about 10 $km^2$ of surface exposed to the air are required to capture 1000000 tons/year of $CO_2$ from the atmosphere. This surface can be conveniently obtained in flat and desert areas where the hydroxide can be spread in the form of slurry in special tanks built in a similar way to salt pans or rice fields and allowed to dry forming a solid mainly formed by $CaCO_3$ and possibly salts if the water used to form the slurry is seawater.

In the latter case, the desert surfaces covered with carbonate generated by carbonation of the hydroxide would be white and would generate an albedo effect reflecting part of the solar radiation and further contributing to contain the increase in the average temperature on earth.

As a skilled person can certainly understand, the process for producing decarbonized oxide or hydroxide according to the invention makes it possible to permanently store $CO_2$ in the sea in the form of bicarbonates and on land in the form of carbonates at a cost that is competitive with the cost of geological CCS, and above all to be able to generate negative $CO_2$ emissions at a much lower cost than any technology currently available on the market, such as DAC+CCS (Direct Air Capture and CCS) or BECCS (Bio Energy and CCS).

As a skilled person will certainly be able to understand, in some cases it may be advantageous to opt for a simplified plant 100 in which, at the expense of a higher energy cost for the calcination process, it is possible to eliminate the investment in an expensive large-sized contactor 20 by eliminating the step of dissolution of the carbonate 220 and by buffering all the $CO_2$ present in the carbonic gas 140 or 151 by means of the oxide 440 or the hydroxide 640.

Figure 9:
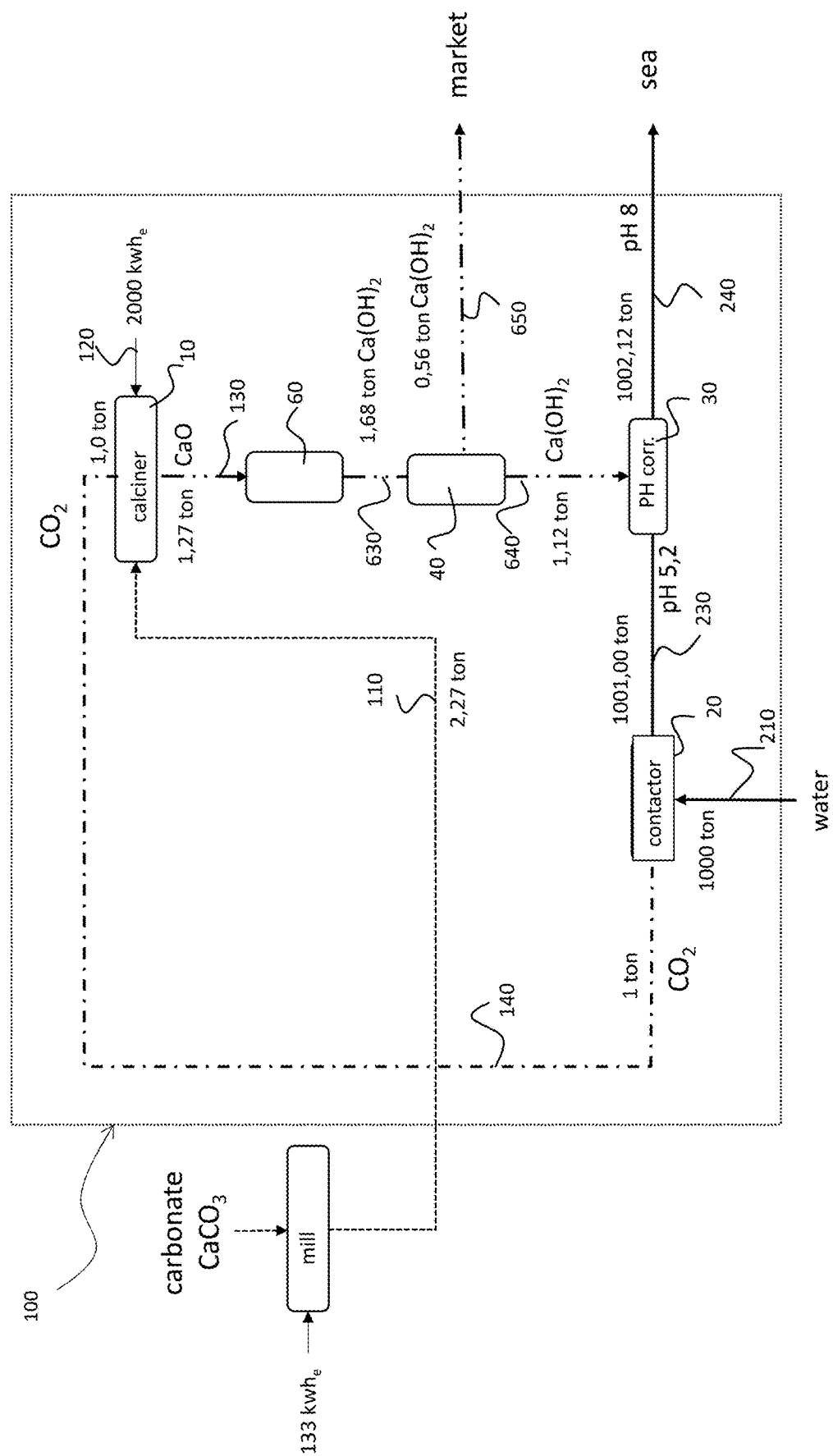
FIG. 9 is a mass and energy balance of a possible embodiment of the plant for producing decarbonized hydroxide according to the invention.

Referring to FIG. 9, a skilled person can certainly understand the simplified mass and energy balance of a particular plant 100 for producing decarbonized hydroxide in which:

the electric calciner 10 is fed by 2270 kg of carbonate ($CaCO_3$) 110 and by 2000 $kWh_e$ of electric power 120 and releases at the outlet 1000 kg of carbonic gas ($CO_2$) 140 and 1271 kg of oxide (CaO) 130;

the contactor is fed by 1000 $m^3$ of water 210 (considered to have a density of 1 kg/$dm^3$), and by 1000 kg of carbonic gas ($CO_2$) 140 and releases at the outlet, after a dwell time of 60 s at an average pressure of 1.5 $bar_a$, 1001000 kg of ionic mixture 230 in which 1000 kg of $CO_2$ and a pH of about 5.2 are still present;

the hydroxide production unit 60 is fed by 1271 kg of oxide 130 released by the electric calciner 10 and by a predetermined flow of water (not shown) and releases at the outlet about 1680 kg of hydroxide ($Ca(OH)_2$) 630;

the dosing device 40 receives at the inlet about 1680 kg of hydroxide 630 released by the hydroxide production unit 60 and releases at the outlet 1121 kg of hydroxide 640 to the pH adjustment apparatus 30 and about 560 kg of hydroxide 650 available for sale as decarbonized hydroxide;

the pH correction apparatus 30 receives at the inlet 1001000 kg of ionic mixture 230 released by the contactor 20 and 1121 kg of hydroxide 640 released by the dosing device 40 and releases 1002121 kg of buffered ionic mixture 240 with pH of 8 exploiting the reaction $$Ca(OH)_{2(aq)} + 2CO_2 \rightarrow Ca(HCO_3)_{2(aq)}$$

where Ca can be substituted with Mg if it were present in the carbonate. In the case of seawater, depending on its chemical composition, 1 mole of $Ca(OH)_2$ neutralises 1.50-2.00 moles of $CO_2$. In the case under examination, a ratio of 1.5 moles of $CO_2$ per mole of $Ca(OH)_2$ is taken into consideration.

As a skilled person will certainly be able to deduce from the above data, not using carbonate 220 in the contactor 20 leads to a reduction of hydroxide 650 available for market or for negative emissions and an increase in specific energy consumption that goes from about 2 MWh/ton to 4 MWh/ton of $Ca(OH)_2$ but with the elimination of a large-sized contactor 20.

As a skilled person will certainly be able to understand, in places where the LCOE of renewable energy power is low, such as in particularly windy areas of Norway or Patagonia, it may be more convenient to use a less energy efficient system 100 but with a lower investment (CAPEX) in the contactor 20.

As a skilled person can well understand from the above example, the hydroxide 650 available for other uses is a fully decarbonized hydroxide in case the electric power 120 powering the calciner and the electric power (not shown in the example) powering the extraction, the transport and the crushing of the carbonate and the pumping of the water were renewable; otherwise, the hydroxide 650 would be decarbonized except for the share of the emissions due to the energy contribution mentioned above.

As a person will certainly be able to understand, the availability of carbonate, water and renewable electric power are not limiting factors to produce enough decarbonized oxide or hydroxide according to the invention to permanently store all the anthropogenic $CO_2$ and to generate the negative $CO_2$ emissions needed to comply with the 2015 Paris Agreements.

As the skilled person can well conclude, the method and the plant according to the invention make it possible to produce decarbonized oxide or hydroxide: it is thus possible to overcome one of the most important technical/economic obstacles to the spread of the plants for the permanent storage of the $CO_2$ and for the generation of negative emissions worldwide and with competitive costs.

It is clear that the specific characteristics are described in relation to different embodiments of the plant and of the method with an illustrative and non-limiting intent. Obviously, further modifications and variations may be made to the plant and the method according to the present invention by a person skilled in the art, in order to meet contingent and specific requirements, all of which are however within the scope of protection of the invention as defined by the following claims.

The invention claimed is:

1. A plant for producing decarbonized oxide or hydroxide, comprising an electric calciner, a contactor, a pH correction apparatus, and a dosing device, wherein:

the electric calciner is configured to at least receive, at the inlet, a first flow of carbonate, electric power and to at least release, at the outlet, a first calciner outlet flow comprising of carbonic gas at high temperature and a second calciner outlet flow comprising of a first flow of oxide;

the plant is configured for obtaining a first flow of buffering substance from the first flow of oxide either by diverting oxide from the first flow of oxide or by reacting water with oxide from the first flow of oxide;

the contactor is adapted to at least receive, at the inlet, carbonic gas from the first calciner outlet flow, a second flow of carbonate, and a flow of water;

the contactor is adapted to make the carbonate from the second flow of carbonate react with water and the $CO_2$ present in the carbonic gas according to the following reactions:

$$CO_{2(aq)} | H_2O_{(l)} \rightleftharpoons H_2CO_{3(aq)} \rightleftharpoons H^+_{(aq)} | HCO^-_{3(aq)} \text{ and}$$

$$CaCO_3 + CO_2 + H_2O \rightarrow Ca(HCO_3)_{2(aq)}$$

wherein Ca can be substituted with Mg if present in the carbonate, and to release, at a first outlet, at least a first flow of ionic mixture;

the contactor is configured for releasing non-soluble gases at a second outlet;

the dosing device is configured to at least receive, at the inlet, the first flow of buffering substance deriving from the electric calciner or a buffering substance produced from the first flow of buffering substance, and to at least release, at the outlet, a second flow of buffering substance and a third flow of buffering substance available for use; and the pH correction apparatus is configured to at least receive, at the inlet, the second flow of buffering substance or a buffering substance produced from the second flow of buffering substance, and the first flow of ionic mixture, wherein said pH correction apparatus is adapted to make the ionic mixture from the first flow of ionic mixture react with the oxide or the hydroxide from the second flow of buffering substance or the buffering substance produced from the second flow of buffering substance according to the following reactions:

$$CaO + H_2O + 2CO_2 \rightarrow Ca(HCO_3)_{2(aq)} \text{ or}$$

$$Ca(OH)_{2(aq)} + 2CO_2 \rightarrow Ca(HCO_3)_{2(aq)}$$

and wherein said pH correction apparatus is configured to at least release, at the outlet, a first flow of buffered ionic mixture.

2. The plant according to claim 1, wherein the first flow of buffering substance is the first flow of oxide originated by the electric calciner, and wherein the pH correction apparatus is adapted to make the ionic mixture from the first flow of ionic mixture react with the oxide from the second flow of buffering substance according to the reaction:

$$CaO+H_2O+2CO_2 \rightarrow Ca(HCO_3)_{2(aq)}$$

wherein Ca can be substituted with Mg if present in the carbonate.

3. The plant according to claim 1, further comprising a hydroxide production unit installed between the dosing device and the pH correction apparatus, wherein:
the first flow of buffering substance comprises oxide diverted from the first flow of oxide,
the hydroxide production unit is configured to receive, at the inlet, at least the second flow of buffering substance released at the outlet of the dosing device, comprising oxide, and a predetermined flow of water, and
the hydroxide production unit is adapted to make the oxide from the second flow of buffering substance react with water according to the reaction:

$$CaO+H_2O \rightarrow Ca(OH)_2$$

wherein Ca can be substituted with Mg if present in the carbonate, and to release, at the outlet, at least a first flow of hydroxide and a first flow of vapour; and
such that the buffering substance produced from the second flow of buffering substance comprises the first flow of hydroxide released by the hydroxide production unit, and the pH correction apparatus is configured to receive, at the inlet, the buffering substance produced from the second flow of buffering substance.

4. The plant according to claim 1, further comprising a control unit and a meter of the chemical parameters of water, wherein:
the meter of the chemical parameters of water is configured to measure the pH and/or the alkalinity and/or the hardness of the ionic mixture or the pH of the buffered ionic mixture and to provide the measurement to the control unit; and
the control unit is configured to control the dosing device so that it feeds the pH correction apparatus with the quantity of buffering substance to obtain a buffered ionic mixture with a desired pH.

5. The plant according to claim 1, wherein the contactor has a volume that allows a minimum contact time of the water with the carbonate and the carbonic gas of 1000 s.

6. The plant according to claim 1, wherein the quantity of carbonate introduced into the contactor is zero and the contactor has a volume that allows a contact time of the water with the carbonic gas greater than 10 s.

7. The plant according to claim 3, further comprising a conduit configured to feed the first flow of vapour released by the hydroxide production unit to the electric calciner.

8. The plant according to claim 1, further comprising a carbonate preheating unit, wherein the carbonate preheating unit is configured to at least receive, at the inlet, carbonic gas at high temperature from the first calciner outlet flow, a third flow of carbonate and to at least release, at the outlet, a first outlet flow of carbonic gas and a first flow of preheated carbonate.

9. A decarbonized calcination method comprising the steps of:
providing an electric calciner;
feeding the electric calciner with at least electric power and a first flow of carbonate in order to obtain the calcination of the carbonate according to the reaction:

$$CaCO_3 \rightarrow CaO+CO_2$$

wherein Ca can be substituted with Mg if present in the carbonate;

releasing at an outlet of the electric calciner at least a first calciner outlet flow comprising of carbonic gas at high temperature and a second calciner outlet flow comprising of a first flow of oxide;
providing a dosing device;
obtaining at an inlet of the dosing device either a first flow of buffering substance from the first flow of oxide or a buffering substance produced from the first flow of buffering substance, and wherein the first flow of buffering substance comprises either oxide diverted from the first flow of oxide toward the dosing device, or hydroxide formed by reacting water with oxide from the first flow of oxide;
providing a contactor;
feeding the contactor with at least carbonic gas from a first calciner outlet flow and a predetermined flow of water in order to obtain a first flow of ionic mixture through the reaction:

$$CO_{2(aq)}+H_2O_{(l)} \rightleftharpoons H_2CO_{3(aq)} \rightleftharpoons H_{(aq)}^+ + HCO_{3(aq)}^-;$$

releasing at least the first flow of ionic mixture at the outlet of the contactor;
feeding at least the first flow of buffering substance to the dosing device;
releasing at least a predetermined second flow of buffering substance at the outlet of the dosing device;
providing a pH correction apparatus;
feeding the pH correction apparatus at least with the first flow of ionic mixture and either the predetermined second flow of buffering substance or a buffering substance produced from the predetermined second flow of buffering substance so that the following reactions take place:

$$CaO+H_2O+2CO_2 \rightarrow Ca(HCO_3)_{2(aq)} \text{ or}$$

$$Ca(OH)_{2(aq)}+2CO_2 \rightarrow Ca(HCO_3)_{2(aq)};$$

releasing at least a first flow of buffered ionic mixture at the outlet of the pH correction apparatus; and
placing the first flow of buffered ionic mixture into the sea.

10. The decarbonized calcination method according to claim 9, further comprising the step of feeding the contactor with at least a predetermined second flow of carbonate so that the following reaction can take place:

$$CaCO_3+CO_2+H_2O \rightarrow Ca(HCO_3)_{2(aq)}$$

wherein Ca can be substituted with Mg if present in the carbonate.

11. The decarbonized calcination method according to claim 9, wherein the predetermined second flow of buffering substance fed to the pH correction comprises oxide diverted from the first flow of oxide.

12. The decarbonized calcination method according to claim 9, wherein the first flow of buffering substance comprises oxide diverted from the first flow of oxide, the method further comprises steps of:
providing a hydroxide production unit;
feeding the hydroxide production unit with at least the predetermined second flow of buffering substance released at the outlet of the dosing device, comprising oxide diverted from the first flow of oxide, and a predetermined flow of water so that the following reaction can take place:

$$CaO+H_2O \rightarrow Ca(OH)_2$$

where Ca can be substituted with Mg if present in the carbonate; and releasing at least a first flow of hydroxide and a first flow of vapour at the outlet of the hydroxide production unit;

such that the buffering substance produced from the predetermined second flow of buffering substance comprises the first flow of hydroxide released by the hydroxide production unit, and then, the buffering substance produced from the predetermined second flow of buffering substance is fed to the pH correction apparatus.

13. The decarbonized calcination method according to claim 9, further comprising the steps of:

providing a control unit and a meter of the chemical parameters of water configured to measure the pH and/or the alkalinity and/or the hardness of the ionic mixture or of the buffered ionic mixture;

providing the pH and/or alkalinity and/or hardness measurement from the pH meter to the control unit; and controlling the dosing device by the control unit so that it feeds the pH correction apparatus with the correct quantity of buffering substance in order to obtain a buffered ionic mixture with a desired pH.

14. The decarbonized calcination method according to claim 12, further comprising the step of:

feeding at least the first flow of vapour to the electric calciner.

15. The decarbonized calcination method according to claim 9, further comprising the steps of:

providing a carbonate preheating unit;

feeding the carbonate preheating unit with at least carbonic gas at high temperature from the first calciner outlet flow and a third flow of carbonate;

releasing at least a first flow of preheated carbonate from the carbonate preheating unit; and feeding the electric calciner with the first flow of preheated carbonate.

16. The plant according to claim 1, further comprising a hydroxide production unit installed between the electric calciner and the dosing device, wherein:

the first flow of buffering substance comprises oxide diverted from the first flow of oxide, the hydroxide production unit is configured to receive, at the inlet, at least the first flow of buffering substance deriving from the electric calciner comprising oxide, and a predetermined flow of water, and the hydroxide production unit is adapted to make the oxide from the first flow of buffering substance react with water according to the reaction:

$$CaO + H_2O \rightarrow Ca(OH)_2$$

wherein Ca can be substituted with Mg if present in the carbonate, and to release, at the outlet, at least a first flow of hydroxide and a first flow of vapour;

such that the buffering substance produced from the first flow of buffering substance comprises the first flow of hydroxide released by the hydroxide production unit, and the dosing device is configured to receive, at the inlet, the buffering substance produced from the first flow of buffering substance.

17. The plant according to claim 16, further comprising a conduit configured to feed the first flow of vapour released by the hydroxide production unit to the electric calciner.

18. The decarbonized calcination method according to claim 9, wherein the first flow of buffering substance comprises oxide diverted from the first flow of oxide, the method further comprising the steps of:

providing a hydroxide production unit;

feeding the hydroxide production unit with at least the first flow of buffering substance released at the outlet of the electric calciner, comprising oxide diverted from the first flow of oxide, and a predetermined flow of water so that the following reaction can take place:

$$CaO + H_2O \rightarrow Ca(OH)_2$$

where Ca can be substituted with Mg if present in the carbonate; and releasing at least a first flow of hydroxide and a first flow of vapour at the outlet of the hydroxide production unit;

such that the buffering substance produced from the first flow of buffering substance comprises the first flow of hydroxide released by the hydroxide production unit, and then, the buffering substance produced from the first flow of buffering substance is fed to the dosing device.

* * * * *